United States Patent
Jha et al.

(10) Patent No.: US 7,886,256 B1
(45) Date of Patent: Feb. 8, 2011

(54) TIMING ANALYSIS OF A MAPPED LOGIC DESIGN USING PHYSICAL DELAYS

(75) Inventors: Pradip Kumar Jha, Cupertino, CA (US); Dinesh D. Gaitonde, Fremont, CA (US); Yau-Tsun Steven Li, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 393 days.

(21) Appl. No.: 12/146,507

(22) Filed: Jun. 26, 2008

(51) Int. Cl.
*G06F 17/50* (2006.01)
*G06F 9/455* (2006.01)

(52) U.S. Cl. ...................... 716/108; 716/113
(58) Field of Classification Search ............ 716/6, 716/108, 113
See application file for complete search history.

(56) References Cited

U.S. PATENT DOCUMENTS 7,092,865 B1 * 8/2006 Burnley et al. ............. 703/14
7,246,340 B1 * 7/2007 Van Antwerpen et al. ..... 716/18
7,594,211 B1 * 9/2009 Tian et al. ..................... 716/6

\* cited by examiner

*Primary Examiner*—Jack Chiang
*Assistant Examiner*—Brandon W Bowers
(74) *Attorney, Agent, or Firm*—LeRoy D. Maunu; Lois D. Cartier

(57) ABSTRACT

Approaches for determining a static timing analysis of a logic design are disclosed. Physical delay arcs of a plurality of physical elements of an integrated circuit specify respective propagation delays from inputs of the physical elements to outputs of the physical elements. Logic components of the logic design are mapped to selected ones of the physical components of the physical elements. For each of the logic components, the logic delay arcs are determined from the physical delay arcs. Each logic delay arc for each logic component specifies a propagation delay from an input of the logic component to an output of the logic component. A static timing analysis of the logic components is performed using the logic delay arc, and data from the timing analysis is output.

20 Claims, 9 Drawing Sheets

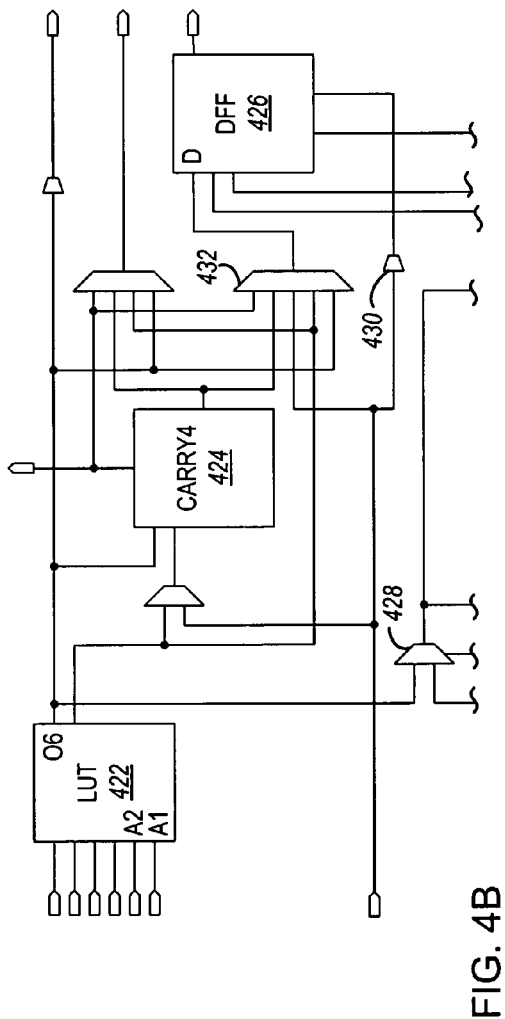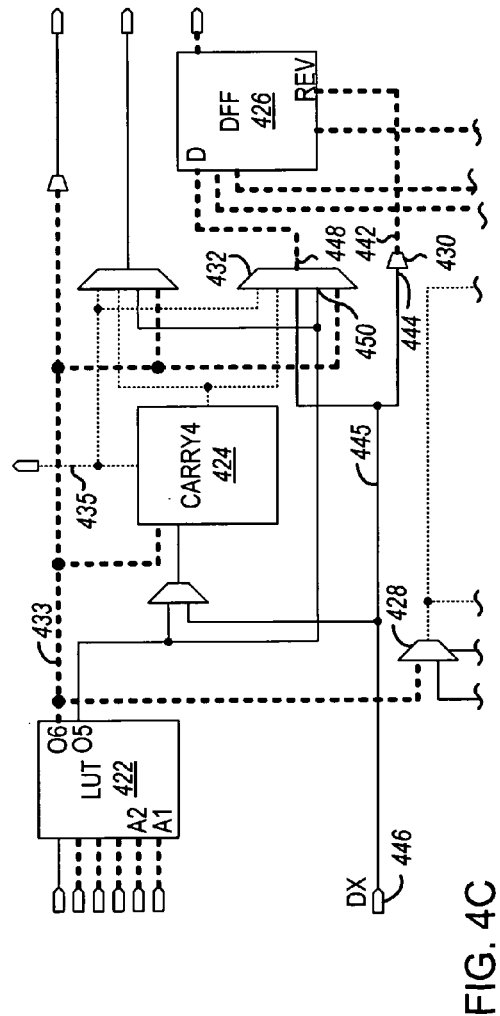
FIG. 4B
FIG. 4C

TIMING ANALYSIS OF A MAPPED LOGIC DESIGN USING PHYSICAL DELAYS

FIELD OF THE INVENTION

The present invention generally relates to timing analysis of a logic design, and more particularly to static timing analysis of a logic design.

BACKGROUND

In the course of developing an electronic circuit design, the designers will invariably need to verify that the design is functionally correct and satisfies physical design constraints. Physical constraints may include timing, space, power consumption and many other factors. Timing analysis provides the designer with information that indicates whether the design, when mapped to particular hardware, satisfies the specified timing constraints such as propagation delays of signals.

Timing analysis may be either static or dynamic. Static timing analysis does not use simulation to determine the expected timing of a logic design, whereas dynamic timing analysis involves simulation. Since dynamic analysis generally requires more hardware resources than does static analysis, it is preferable to subject a design to static timing analysis before proceeding with dynamic analysis and simulation in order to detect and correct any easily identifiable problems.

Both static and dynamic analyses require a mapping of the logic design to specific hardware resources in order to use attributes of those hardware resources for determining timing information. The mapping of the logic design to hardware resources, however, may create challenges for the designer in changing the design to fix any problems. In mapping components of a logic design to hardware resources, a single logic component may be mapped to several hardware resources. Also, for some target hardware devices, for example, field programmable gate arrays (FPGA), multiple logic components may be mapped to a single hardware resource. Thus, it may be difficult for the designer to reconcile the problems reported from the timing analysis with components and connections in the logic design.

The present invention may address one or more of the above issues.

SUMMARY

The present invention provides various embodiments for determining a static timing analysis of a logic design. In one embodiment, a method inputs physical delay arcs of a plurality of physical elements of an integrated circuit. Each physical element includes one or more physical components and each physical delay arc of the physical element specifies a propagation delay from an input of the physical element to an output of the physical element. The method respectively maps a plurality of logic components of the logic design to selected ones of the physical components of the physical elements. For each of the logic components, the method determines logic delay arcs from the physical delay arcs of the physical element that includes the physical component to which the logic component is mapped. Each logic delay arc for each logic component specifies a propagation delay from an input of the logic component to an output of the logic component. A static timing analysis of the logic components of the logic design is performed using the logic delay arcs. The method then outputs a description of the static timing analysis of the logic components of the logic design.

In another embodiment, a processor-implemented method of static timing analysis of a logic design includes mapping a plurality of logic components of the logic design to a plurality of physical elements of an integrated circuit, with at least two of the logic components being mapped to one of the physical elements. The method inputs physical element delay arcs of the physical elements of the integrated circuit. The method determines logic delay arcs of the logic components from the physical element delay arcs of the physical elements, which includes determining the logic delay arcs of the at least two of the logic components from the physical element delay arcs of the one of the physical elements. A static timing analysis of the logic components of the logic design is performed using the logic delay arcs, and data that describes the analysis is output.

A program storage medium is provided in another embodiment. The program storage medium includes a processor-readable device configured with instructions for determining timing characteristics of a logic design. Execution of the instructions by one or more processors causes the one or more processors to perform operations including inputting physical delay arcs of a plurality of physical elements of an integrated circuit. Each physical element includes one or more physical components and each physical delay arc of the physical element specifies a propagation delay from an input of the physical element to an output of the physical element. A plurality of logic components of the logic design are respectively mapped to selected ones of the physical components of the physical elements. For each of the logic components, logic delay arcs are determined from the physical delay arcs of the physical element that includes the physical component to which the logic component is mapped. Each logic delay arc for each logic component specifies a propagation delay from an input of the logic component to an output of the logic component. A static timing analysis of the logic components of the logic design is performed using the logic delay arcs, and a description of the static timing analysis is output.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 4B illustrates a partial slice of an FPGA;

FIG. 4C shows logic components having been mapped to physical components of the partial slice of FIG. 4B and illustrates the tagging of physical pins and connections for purposes of showing whether or not the mapped design is routable;

DETAILED DESCRIPTION OF THE DRAWINGS

Figure 1:
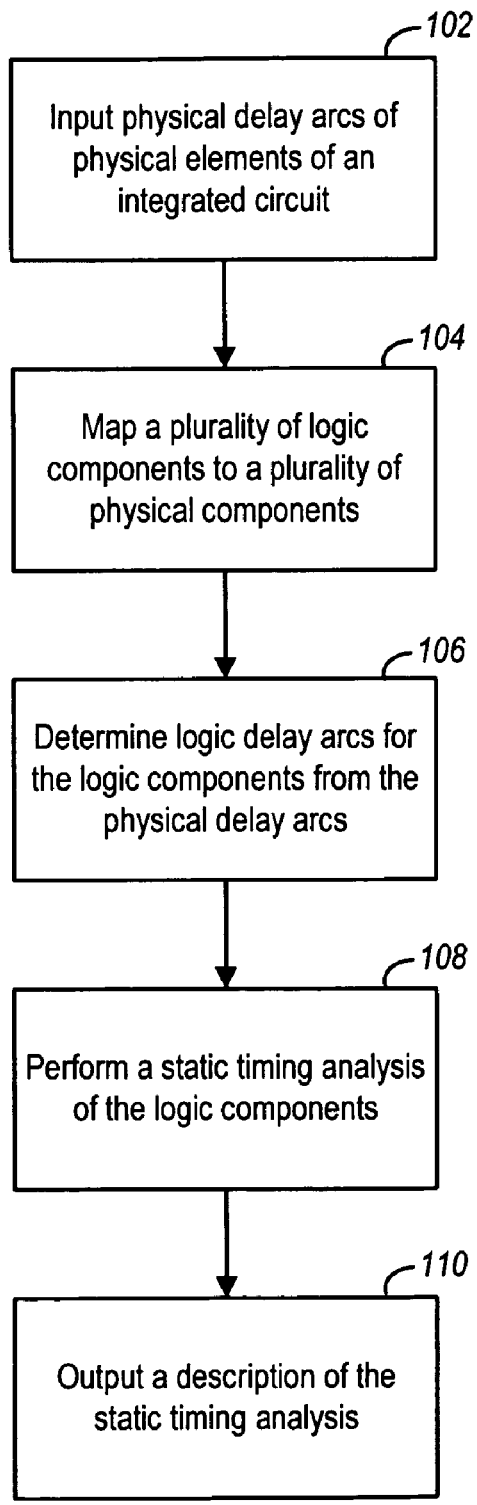
FIG. 1 illustrates a flow diagram of a process for determining timing characteristics of a logic design according to an example embodiment of the present invention.

FIG. 1 illustrates a flow diagram of a process for determining timing characteristics of a logic design according to an example embodiment of the present invention. The logic design includes a plurality of logic components. Physical delay arcs of a plurality of physical elements of an integrated circuit are input at step 102. The physical elements each include one or more physical components that can be configured to implement functions of the logic components. The physical delay arcs specify propagation delays from the inputs to the outputs of the physical elements. The plurality of logic components of the logic design are mapped to the physical components of the physical elements in step 104. In one implementation, at least two of the logic components are mapped to physical components of the same physical element.

The physical delay arcs of the physical elements to which the logic components are mapped are used to determine logic delay arcs for the logic components in step 106. The logic delay arcs specify propagation delays from the inputs to the outputs of the logic components. A static timing analysis of the logic components is performed using the logic delay arcs in step 108. In one implementation, the static timing analysis identifies and characterizes critical timing paths of the logic design. A description of the static timing analysis is output in step 110. In an example embodiment, the description specifies the logic delay arcs.

In one implementation, physical wire delay arcs are also input, for example, in step 102. The physical wire delay arcs each specify a propagation delay of a physical wire that connects an output of one of the physical elements to an input of another one of the physical elements. The physical wire delay arcs are used to determine logic wire delay arcs for each one of a plurality of connections in the logic design from an output of one of the logic components to an input of another one of the logic components, for example, in step 106. The logic wire delay arcs each specify a propagation delay from an output of one of the logic components to an input of another one of the logic components. The logic wire delay arcs are also used to perform the static timing analysis, for example, in step 108. The results of the static timing analysis are output in step 110. In an example embodiment, the output data specifies the propagation delays of the logic wire delay arcs. Any logic wire delay arc having a propagation delay that exceeds a design constraint may be tagged, highlighted or otherwise marked for ease of identification by a user.

The mapping of the physical timing information to the logic delays provides an accurate static timing analysis. In addition, the designer benefits from having timing data available for the logical view of the design. This allows the designer to view and fix problems at the logical level rather than at the physical level.

Figure 2A:
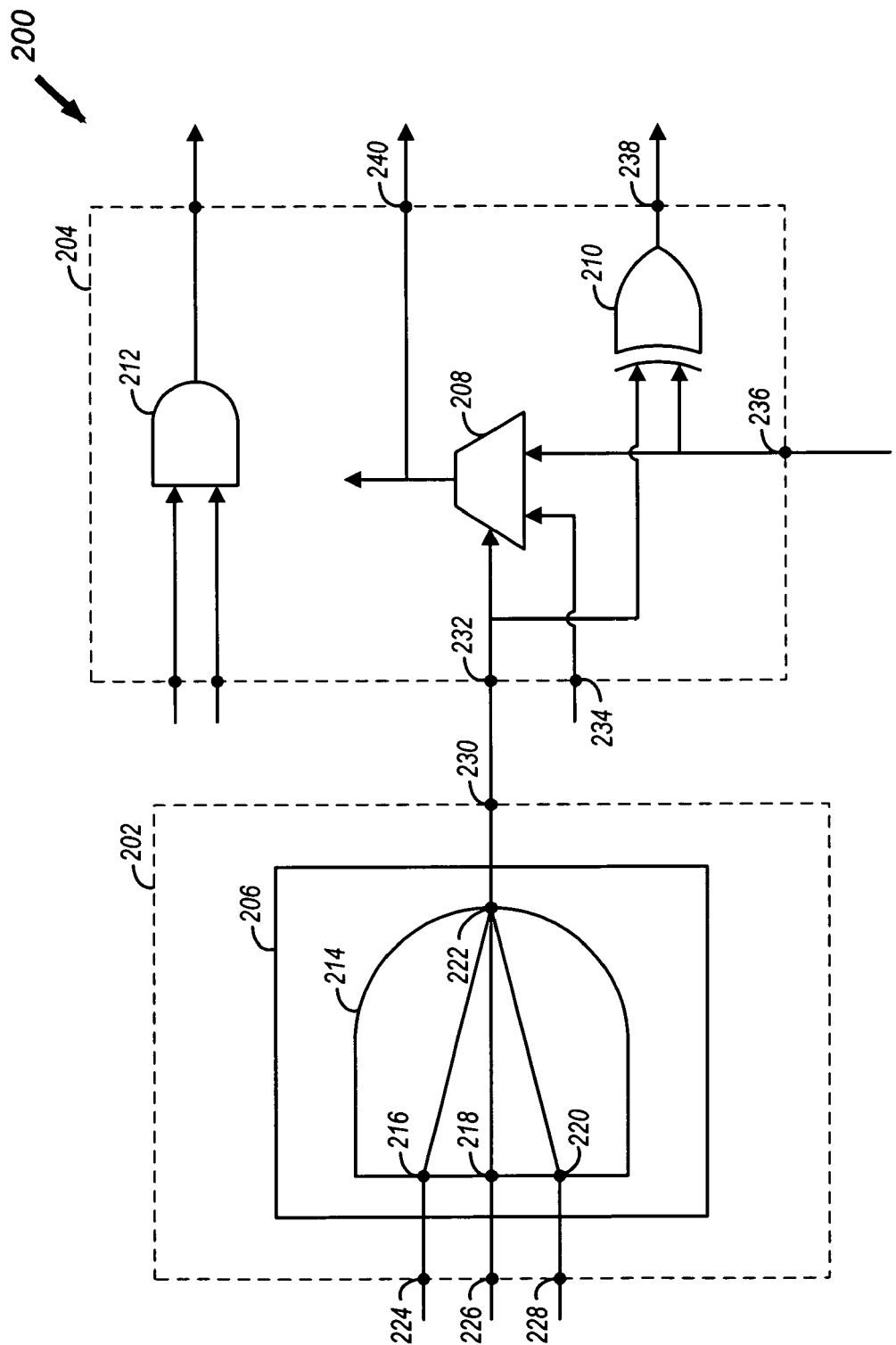
FIG. 2A illustrates a block diagram of logic components of a logic design that are mapped to physical components of physical elements according to an example embodiment of the present invention.

FIG. 2A illustrates a block diagram 200 of logic components of a portion of an example logic design that are mapped to physical components of physical elements according to an example embodiment of the present invention. The logic components are mapped to respective ones of the physical components. Physical elements 202 and 204 contain physical components including LUT (look-up-table) 206, multiplexer 208, XOR gate 210 and AND gate 212. In this example, the physical elements 202 and 204 are part of a programmable logic block of a programmable logic integrated circuit (IC). The programmable logic IC includes an interconnect net, and the programmable logic block is connected by physical nets to other programmable logic blocks.

The portion of the example logic design contains three logic components, namely an AND gate 214 that is mapped to LUT 206, a multiplexer 208 that is mapped to multiplexer 208, and an XOR gate 210 that is mapped to XOR gate 210. The physical elements 202 and 204 may also include physical elements to which no logic components of the logic design are mapped, such as AND gate 212. Logic component 214 has four logical pins, including three input pins 216-220 and one output pin 222, which are mapped to physical input pins 224-228 and physical output pin 230 of physical element 202, respectively. Similarly, the logical pins of the multiplexer 208 are mapped to physical pins 232, 234, 236, and 240 of physical component 204, and the logical pins of the XOR gate 210 are mapped to physical pins 232, 236, and 238 of physical component 204.

In one implementation, the mapping of the logical pins to the physical pins (i.e., placing the logic components on the physical components by way of storing information that specifies the mapping) also determines whether or not the nets connecting the logic components can be routed properly to the corresponding physical components. Therefore, the mapping process considers the legality of considered placements. The mapping process uses the pin mapping information to match the logical net connected to a logical pin to the physical connection connected to the corresponding physical pin. The physical connection is tagged with the corresponding logical net. If a physical net contains two or more different logical net tags, then more than one logical net would need to use the physical net to route a signal, which is not possible. The situation in which a physical net contains two or more different logical net tags indicates the nets connecting the logic components cannot be routed properly to the corresponding physical components. Thus, the logic components cannot be placed on the selected physical components, and a different mapping must be tried.

There are two types of delay arcs, component delay arcs and wire delay arcs. Component delay arcs specify the delay inside a component. In the physical domain, the component delay arcs specify the propagation delays from each input to each output of physical elements 202 and 204. For physical element 202, the component delay arcs specify the propagation delay from input pin 224 to output pin 230, the propagation delay from input pin 226 to output pin 230, and the propagation delay from input pin 228 to output pin 230. For physical element 204, the component delay arcs specify the propagation delay from input pin 232 to output pin 240, the propagation delay from input pin 234 to output pin 240, the propagation delay from input pin 236 to output pin 240, the propagation delay from input pin 232 to output pin 238, and the propagation delay from input pin 236 to output pin 238. In the logic domain, the component delay arcs specify the propagation delays from each input to each output of the logical components (e.g., AND gate 214, multiplexer 208 and XOR gate 210). For example, for AND gate 214, the component delay arcs specify the propagation delay from input pin 216 to output pin 222, the propagation delay from input pin 218 to output pin 222, and the propagation delay from input pin 220 to output pin 222.

Wire delay arcs are also referred to as net delay arcs and specify the delays between components. In the physical domain, a wire delay arc specifies the propagation delay from the output pin 230 of physical element 202 to input pin 232 of physical element 204. In the logic domain, wire delay arcs specify the propagation delay from the output pin 222 of logic component 214 to an input pin of multiplexer 208, and the propagation delay from the output pin 222 of logic component 214 to an input pin of XOR gate 210.

The physical delay arcs for the physical domain are used to calculate the logic delay arcs in the logic domain. The first step is to map the logical components to the physical components as discussed above. The next step is to map the actual physical delay arcs for the physical components to which the logic components are mapped, to the logic delay arcs. The delays of the logic delay arcs are then calculated from the mapped physical delay arcs. In one example mapping, there may be only one logical component mapped to a physical element, such as AND gate 214 being mapped to LUT 206 of physical element 202. In this instance, there is a one-to-one correspondence between the physical component delay arcs and the logic component delay arcs (i.e., the propagation delays from inputs pin 216-220 to output pin 222 correspond to the propagation delays from inputs pin 224-228 to output pin 230, respectively). In another example mapping, multiple logic components are mapped to physical components of the same physical element, such as the multiplexer 208 and the XOR gate 210 being mapped to multiplexer 208 and XOR gate 210, respectively, of physical element 204. The discussion of FIG. 2B below describes how the logic component delay arcs for the logic components mapped to physical element 204 are determined.

In order to determine the logic wire delay arcs, the physical wire delay arcs are mapped for each connection in the logic design from an output of one of the logic components to an input of another one of the logic components. The logic wire delay arcs are then determined from the physical wire delay arcs of the wires connecting the physical elements that include the physical components to which the logic components are mapped. The logic wire delay arcs each specify a propagation delay from an output of one of the logic components to an input of another one of the logic components. There may be a one-to-one mapping between a physical wire delay arc and logic wire delay arcs when the logic components are mapped to physical elements in the same programmable logic block (i.e., the physical wire delay arc is equal to the logic wire delay arcs). For example, the logic wire delay arc for the connection from the output pin 222 of logic component 214 to an input of multiplexer 208 is mapped to the physical wire delay arc for the connection from the output pin 230 of physical element 202 to input pin 232 of physical element 204, and the logic wire delay arc for the connection from the output pin 222 of logic component 214 to an input of XOR gate 210 is also mapped to the physical wire delay arc from the output pin 230 of physical element 202 to input pin 232 of physical element 204.

Another example mapping may have logic components mapped to physical elements that are in different programmable logic blocks of a programmable logic IC. In this situation, the logic wire delay arc for a connection from an output of one logic component to an input of another logic component is broken into three physical parts. The first part is the physical wire delay arc of the net connecting the output pin of the physical element (to which the logic component is mapped) to the output pin of the programmable logic block. The second part is the physical wire delay arc of the net connecting the output pin of the programmable logic block to the input pin of the other programmable logic block that contains the other physical element (to which the other logic component is mapped). The third part is the physical wire delay arc of the net connecting the input pin of the destination programmable logic block to the input pin of the other physical element. The logic wire delay arc is calculated by summing the physical wire delay arcs for the three parts.

Figure 2B:
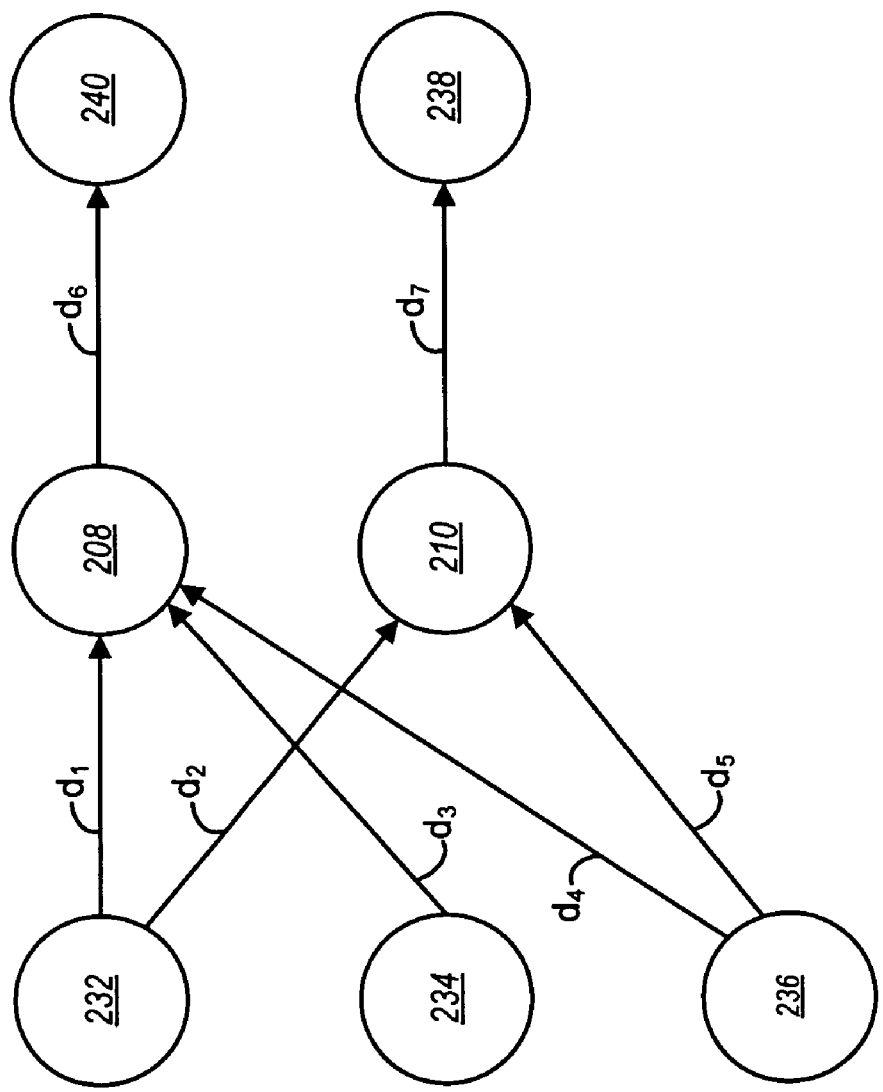
FIG. 2B illustrates a graph of nodes and delay arcs between physical components according to an example embodiment of the present invention.

FIG. 2B illustrates a graph of nodes and delay arcs between physical components according to an example embodiment of the present invention. The labels of the nodes 208, 210, 232, 234, 236, 238, and 240 correspond to the like-numbered labels of physical element 204 shown in FIG. 2A. The propagation delays of the physical component delay arcs of physical element 204 are known according to device specifications. For example, the delay $D_{232,240}$ from node 232 to node 240, the delay $D_{234,240}$ from node 234 to node 240, the delay $D_{236,240}$ from node 236 to node 240, the delay $D_{232,238}$ from node 232 to node 238, and the delay $D_{236,238}$ from node 236 to node 238 are known from device specifications. These physical component delay arcs of physical element 204 are used to determine the logic component delay arcs $d_1$-$d_7$ of the logic components that are mapped to physical components 208 and 210. For the logic component mapped to the physical component 208 as represented by node 208, the physical delay $D_{232,240}$ is equal to the logical component delay arcs $d_1+d_6$; the physical delay $D_{234,240}$ is equal to the logical component delay arcs $d_3+d_6$; and the physical delay $D_{236,240}$ is equal to the logical component delay arcs $d_4+d_6$. For the logic component mapped to the physical component 210 as represented by node 210, the physical delay $D_{232,238}$ is equal to the logical component delay arcs $d_2+d_7$; and the physical delay $D_{236,238}$ is equal to the logical component delay arcs $d_5+d_7$.

Figure 3:
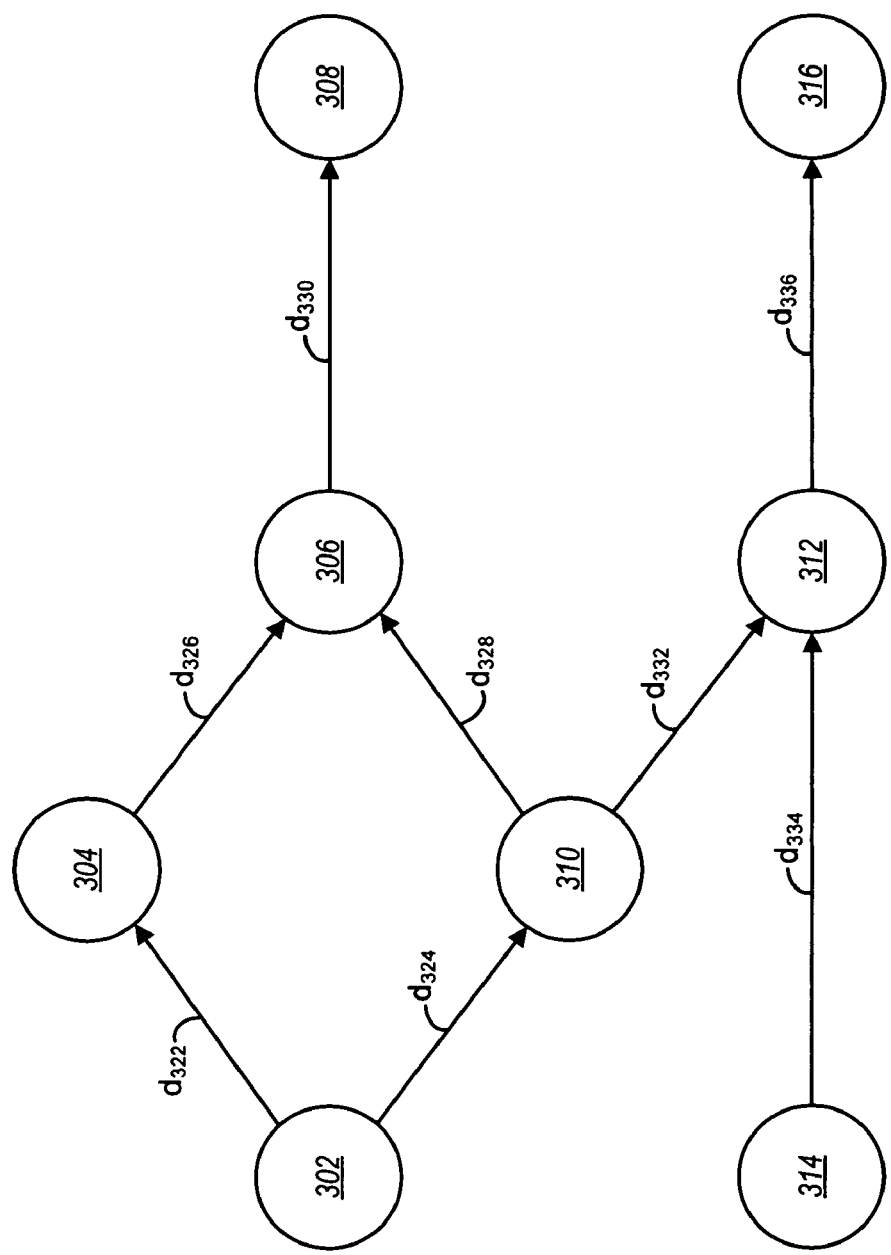
FIG. 3 illustrates a graph of nodes and delay arcs between physical components of a physical element with re-convergent fan-out according to an example embodiment of the present invention.

FIG. 3 illustrates an example graph of nodes and delay arcs between physical components of a physical element with re-convergent fan-out. The physical component delay arcs for the example physical element are from the input pins to the output pins and include the following physical delays: $D_{302,308}$ (from node 302 to node 308), $D_{302,316}$ (from node 302 to node 316), and $D_{314,316}$ (from node 314 to node 316). These physical delays are used to determine each of the individual logical component delay arcs $d_{322}$, $d_{324}$, $d_{326}$, $d_{328}$, $d_{330}$, $d_{332}$, $d_{334}$, and $d_{336}$, such that the maximum delay from each start point in the graph (i.e., nodes 302 and 314) to each end point (i.e., nodes 308 and 316) for which a path exists is as close as possible to what is specified. For example, if all of the paths from node 302 to node 308 are considered, and the maximum of the delays is computed for such paths, this value should be as close to $D_{302,308}$ as possible. This relationship holds for each of the other start and endpoint pairs.

When considering the paths from node 302 to node 308, with $d_{302,n}$ denoting the maximum delay from node 302 to node n, the following equations hold:

a. $d_{302,304}=d_{322}$
b. $d_{302,310}=d_{324}$
c. $d_{302,306}=\max(d_{302,304}+d_{326}, d_{302,310}+d_{328})$
d. $d_{302,308}=d_{302,306}+d_{330}$
e. $\text{error}_{302,308}=\|d_{302,308}-D_{302,308}\|$ where an uppercase "D" denotes a physical component delay, and a lowercase "d" denotes a logical component delay.

The $\text{error}_{302,308}$ is the absolute difference between that which was computed to be the maximum delay, $d_{302,308}$, and the physical delay according to device specifications. Similar sets of equations are created for the paths from node 302 to node 316 (error$_{302,316}$) and for the paths from node 314 to node 316 (error$_{314,316}$). The individual delay arcs d$_{322}$, d$_{324}$, d$_{326}$, d$_{328}$, d$_{330}$, d$_{332}$, d$_{334}$, and d$_{336}$ are then computed such that the sum of the errors (error$_{302,308}$, error$_{302,316}$ and error$_{314,316}$) is minimized. In one implementation, a general purpose non-liner optimization engine is used to solve the system of equations and determine the individual delay arcs. In another implementation, the system of equations can be posed as a linear programming problem.

Figure 4A:
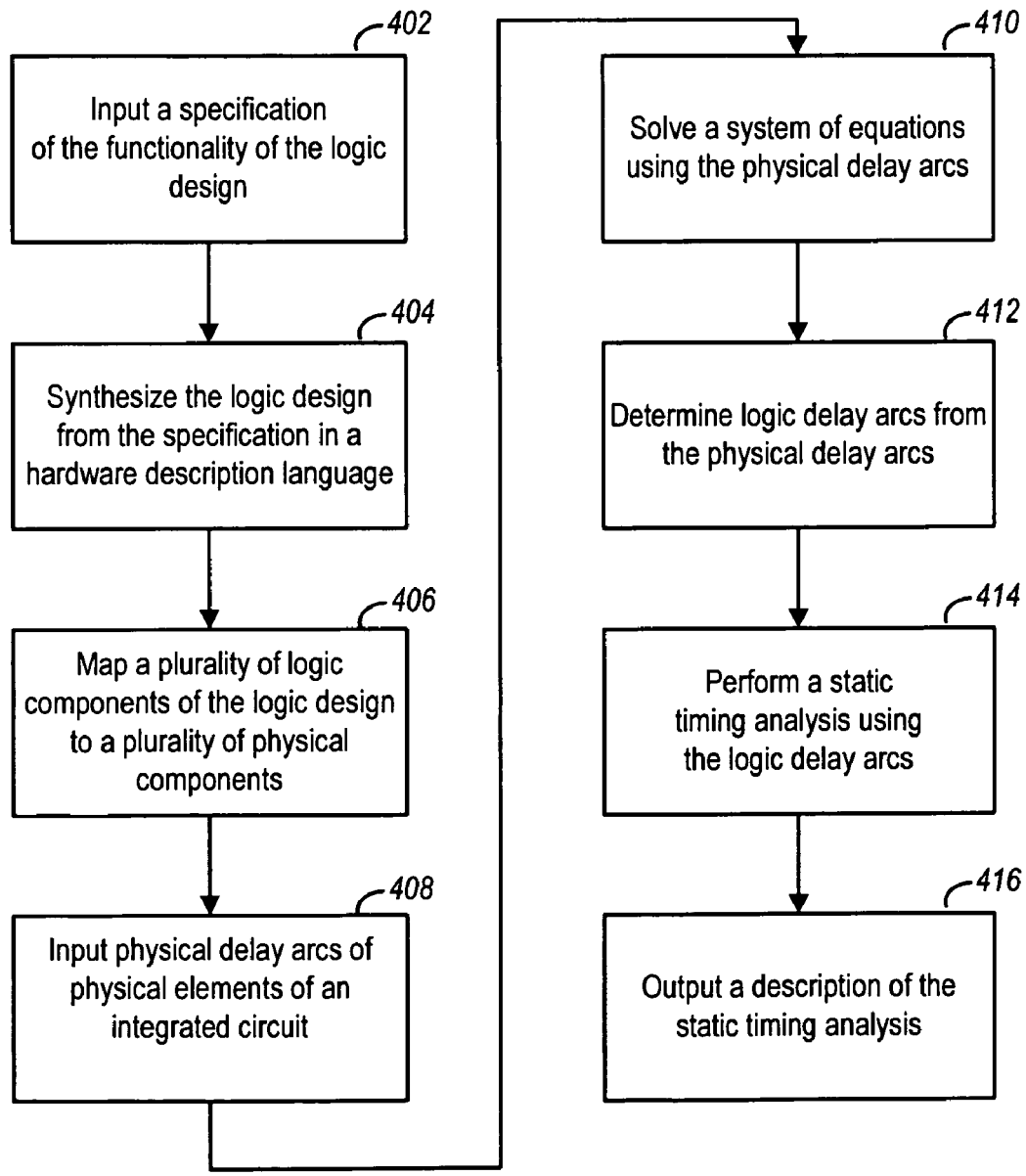
FIG. 4A illustrates a flow diagram of a process for static timing analysis of a logic design according to an example embodiment of the present invention.

FIG. 4A illustrates a flow diagram of a process for static timing analysis of a logic design according to an example embodiment of the present invention. A specification that identifies the functionality of the logic design, such as a hardware description language specification, is input in step 402. The logic design is then synthesized from the input specification in step 404.

A plurality of logic components of the logic design are mapped to a plurality of physical components of the physical elements in step 406. At least two of the logic components are mapped to physical components of the same physical element.

Physical delay arcs of the physical elements are input at step 408. A system of equations is solved using the physical delay arcs of the physical elements to which the at least two logic components are mapped in step 410. The physical delay arcs of the physical elements to which the logic components are mapped are used to determine logic delay arcs for the logic components in step 412. A static timing analysis of the logic components is performed using the logic delay arcs in step 414, and a description of the static timing analysis is output in step 416.

For aiding in the mapping of logic components to physical components described in step 406, in one embodiment the invention uses a data-driven approach to describe rules for assigning logic components to physical components. The examples in the following paragraphs use and reference elements from an FPGA. Those skilled in the art will recognize that the invention may be similarly applied to other types of devices with different elements.

According to one embodiment, the possible mappings of logic components to physical components of an FPGA are specified in a data file. The data may be specified using a markup language such as XML, for example. Using such a data file allows ease of adaptation for new hardware architectures, and the data file may also be used to evaluate whether the connections in a proposed mapping may be feasibly routed using the available resources.

The data file describes how a logic component may be assigned to a physical component. For routability evaluation, the data file also describes how the logical pins of the logic component would be mapped to physical pins of the physical component. The example data file below is specified in XML and describes available mappings of certain logic components to physical components of a particular FPGA.

```
<cell>AND
  <cellpin>I0</cellpin>
  <cellpin>I1</cellpin>
  <cellpin>O</cellpin>
</cell>
<site_type>SLICEL
  <bel>D6LUT
    <belpin>A1</belpin>
    <belpin>A2</belpin>
    <belpin>O6</belpin>
  </bel>
```

```
</site_type>
<site_type>SLICEL
  <bel>C6LUT
    <belpin>A1</belpin>
    <belpin>A2</belpin>
    <belpin>O6</belpin>
  </bel>
</site_type>
<site_type>SLICEL
  <bel>B6LUT
    <belpin>A1</belpin>
    <belpin>A2</belpin>
    <belpin>O6</belpin>
  </bel>
</site_type>
<site_type>SLICEL
  <bel>A6LUT
    <belpin>A1</belpin>
    <belpin>A2</belpin>
    <belpin>O6</belpin>
  </bel>
</site_type>
...
<cell>FD
  <cellpin>D</cellpin>
  <cellpin>Q</cellpin>
  <cellpin>C</cellpin>
</cell>
<site_type>SLICEL
  <bel>DFF
    <belpin>D</belpin>
    <belpin>Q</belpin>
    <belpin>CK</belpin>
  </bel>
</site_type>
<site_type>SLICEL
  <bel>CFF
    <belpin>D</belpin>
    <belpin>Q</belpin>
    <belpin>CK</belpin>
  </bei>
</site_type>
<site_type>SLICEL
  <bel>BFF
    <belpin>D</belpin>
    <belpin>Q</belpin>
    <belpin>CK</belpin>
  </bel>
</site_type>
<site_type>SLICEL
  <bel>AFF
    <belpin>D</belpin>
    <belpin>Q</belpin>
    <belpin>CK</belpin>
  </bel>
</site_type>
```

The above example data file describes the possible mappings for two logic components, an AND gate and a flip-flop, FD. The AND gate has 3 logical pins, I0, I1, and O. The AND gate can be mapped to the physical components, D6LUT, C6LUT, B6LUT, or A6LUT of a slice-type physical element of the FPGA. In each possible mapping, the I0 logical pin would be mapped to the A1 physical pin of the physical component. Similarly, the I1 logical pin would be mapped to the A2 physical pin, and the O logical pin would be mapped to physical pin, O6. The mapping of the flip-flop is similar.

The process of mapping the logic components to the physical components may be iterative in that a proposed mapping may be generated, and within the mapping process that proposed mapping is evaluated for whether or not the signals of the design can be feasibly routed between the physical elements. If the mapping is routable, the mapping may be considered complete. Otherwise, an alternative mapping may be generated. FIGS. 4B and 4C illustrate how the pin mappings may be used in determining whether or not routing is possible for a given mapping. Generally, the process entails determining whether the physical pins are reachable either from the primary inputs of the physical element (the partial slice in the example) or from the output pins of other physical components of the slice.

FIG. 4B illustrates a part of a slice physical element of an FPGA such as the VIRTEX®-5 FPGA from XILINX®, Inc. The physical components of interest include the following: D6LUT 422, CARRY4 424, D flip-flop (DFF) 426, MUX 428, programmable interconnection point (PIP) component 430, and MUX 432. FIG. 4C shows the LUT and flip-flop logic components having been mapped to physical components 422 and 426, respectively. The input and output physical connections for the two physical components that are used in the mapping are designated with thick, dashed lines, such as line 433.

To check whether the D input pin of the DFF component 426 is reachable, the process proceeds as follows. The signals of logic components that tag any output physical connections are propagated through the unused physical components of the physical element, and those outputs are marked as being used. For example, the D6LUT 422 O6 pin is shown as being tagged with the thick, dashed line 433. Since the O6 output pin is connected to the CARRY4 424 and the MUX 428 components, which are unused, all outputs from these two components are marked as being used, which is illustrated with the thin, dotted lines, for example line 435.

The process continues in the checking of the routability with checking each PIP component. PIP components are generally considered to include multiplexers through which signals may be routed. If the output connection of a PIP component is tagged by way of being connected to the REV input of the DFF component, then the input connection(s) of the PIP component must either have the same tag or must be unused (not tagged). For example, the PIP component 430 has its output connection 442 tagged (designated with the thick, dotted line) because it is connected to the REV input of the DFF 426. In this case the input connection 444 to the PIP component 430 is vacant, as illustrated with the thin solid line 445.

Figure 4D:
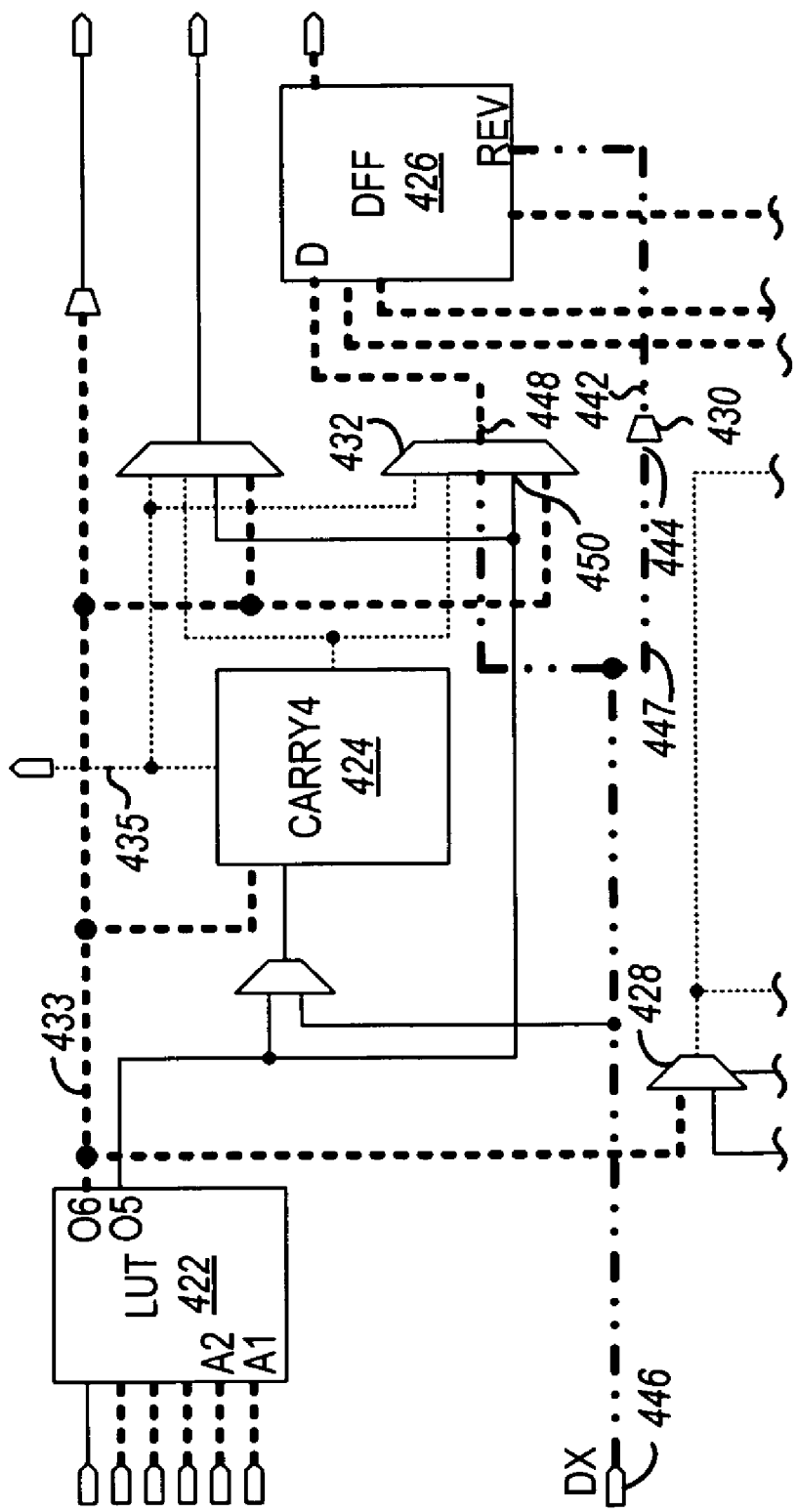
FIG. 4D shows the logic components and physical components of FIG. 4C and further illustrates routability checking through programmable interconnection points in the FPGA.

The input connection to PIP component 430 is thereafter tagged the same as its output connection, as shown in FIG. 4D. For purposes of illustration, the thick, dash-dot-dot-dashed line 447 represents the input as having been tagged. The REV signal to the DFF is therefore provided by the DX primary input pin 446 through the PIP component 430.

At the MUX 432, the output connection 448 is tagged as a result of being connected to the D input of DFF 426. For the placement to be legal, at least one of the input connections to MUX 432 must have the same tag or be vacant. The tagged input connections are O6 from LUT 422 and the DX primary input 446. Any used inputs are ignored. If the output connection tag is the same as that of O6 from LUT 422, the output matches the input and the LUT and FF placements are legal. Similarly, if the output connection tag matches the signal mapped to the DX primary input pin 446, the output matches the input and the LUT and FF placements are legal. If the output connection is tagged differently from both of the O6 from LUT 422 and the DX primary input pin 446, then the only possible routing would be through the vacant pin 450 in MUX 432. In this case, an additional check on the LUT 422 and any other LUT (not shown) that shares input pins would be needed.

Figure 5:
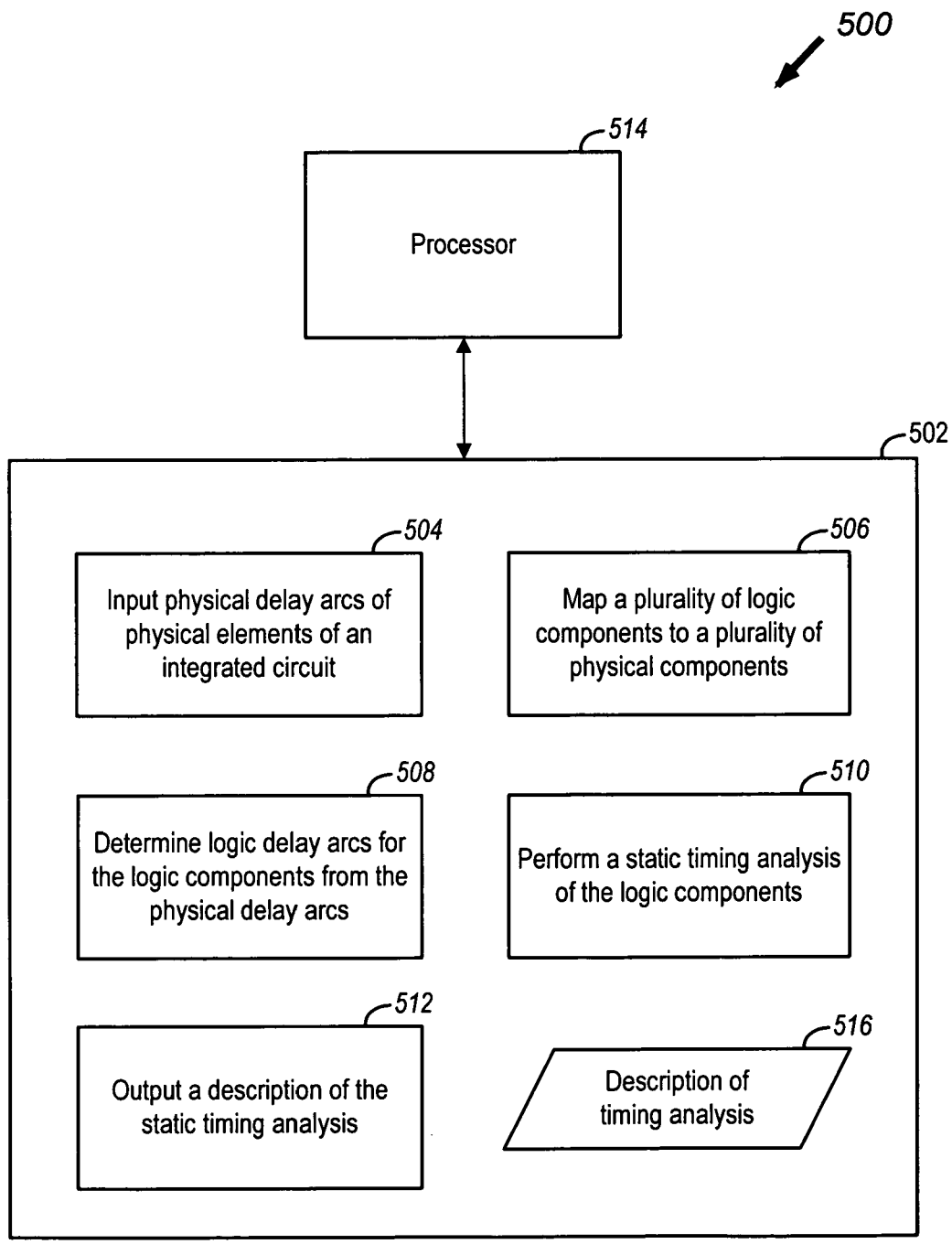
FIG. 5 illustrates a block diagram of a system for determining timing characteristics of a logic design according to an example embodiment of the present invention.

FIG. 5 illustrates a block diagram of a system 500 for determining timing characteristics of a logic design according to an example embodiment of the present invention.

Processor-readable device 502 is configured with software modules 504, 506, 508, 510, and 512. Execution of the instructions of software modules 504, 506, 508, 510, and 512 by processor 514 causes processor 514 to perform a static timing analysis of the logic design and output a description of the static timing analysis. In one embodiment, the description 516 of the static timing analysis is stored on the processor readable device 502.

Execution of the instructions of software module 504 causes processor 514 to input physical delay arcs of a plurality of physical elements of an integrated circuit. Execution of the instructions of software module 506 causes processor 514 to map a plurality of logic components of the logic design to physical components of the physical elements. Execution of the instructions of software module 508 causes processor 514 to determine logic delay arcs for each of the logic components from the physical delay arcs of the physical elements that contain physical components to which the logic components are mapped. Execution of the instructions of software module 510 causes processor 514 to perform a static timing analysis of the logic components using the logic delay arcs. Execution of the instructions of software module 512 causes processor 514 to output a description of the static timing analysis.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

Figure 6:
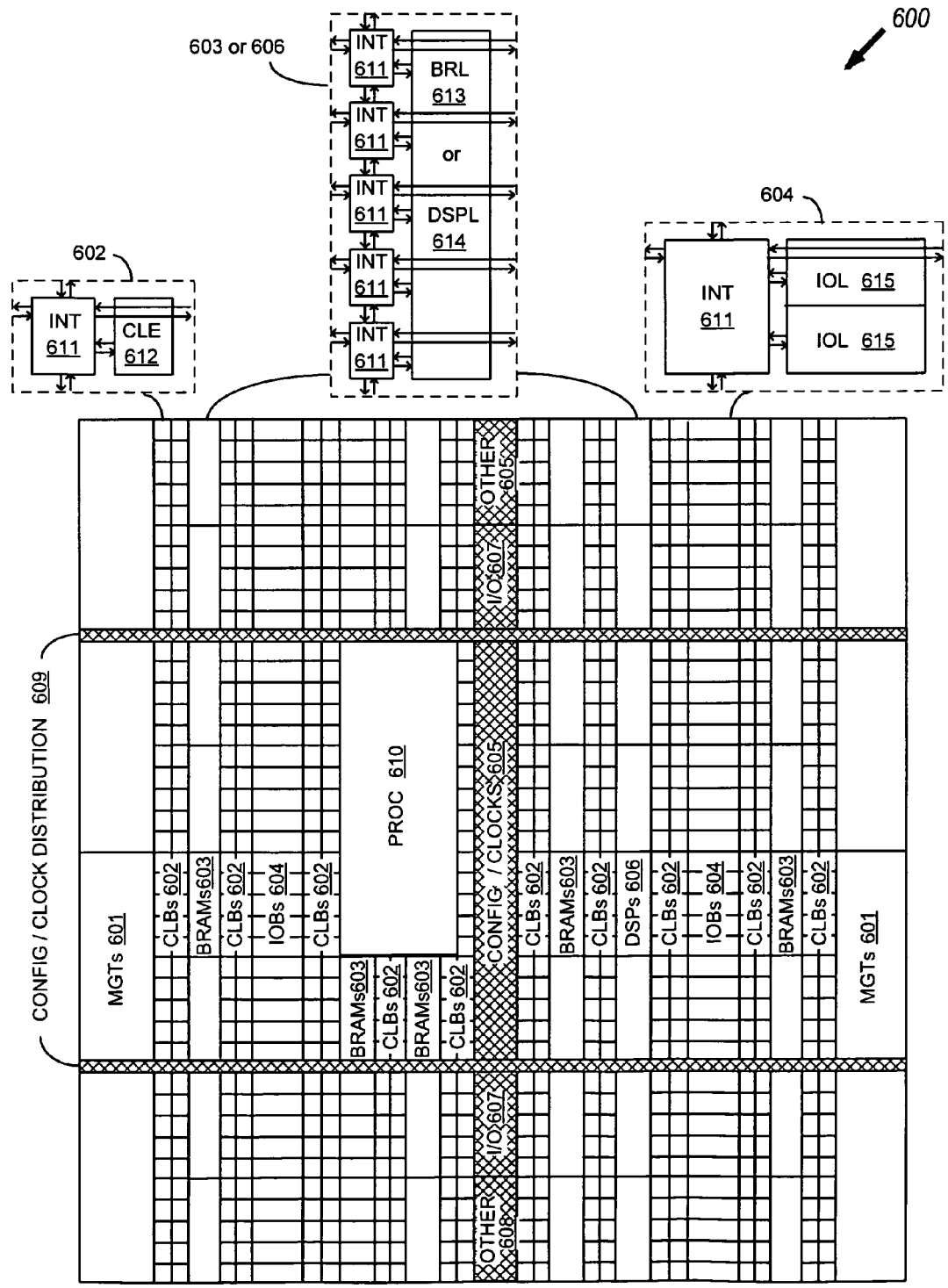
FIG. 6 illustrates an FPGA architecture that includes several different types of programmable logic blocks.

FIG. 6 illustrates an FPGA architecture that includes several different types of programmable logic blocks. Those skilled in the art will appreciate that the FPGA of FIG. 6 provides only one example of an integrated circuit device on which the methods of the present invention can be practiced. Advanced FPGAs can include several different types of programmable logic blocks in the array. For example, FIG. 6 illustrates an FPGA architecture 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

The present invention is thought to be applicable to a variety of systems that determine timing characteristics of a logic design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for determining a static timing analysis of a logic design, comprising:
on at least one processor, executing instructions that cause the processor to perform operations including:
inputting physical delay arcs of a plurality of physical elements of an integrated circuit, each physical element including one or more physical components and each physical delay arc of the physical element specifying a propagation delay from an input of the physical element to an output of the physical element;
respectively mapping a plurality of logic components of the logic design to selected ones of the physical components of the physical elements;
for each of the logic components, determining logic delay arcs from the physical delay arcs of the physical element that includes the physical component to which the logic component is mapped, wherein each logic delay arc for each logic component specifies a propagation delay from an input of the logic component to an output of the logic component;
performing a static timing analysis of the logic components of the logic design using the logic delay arcs; and
outputting a description of the static timing analysis of the logic components of the logic design.

2. The processor-implemented method of claim 1, further comprising:
inputting physical wire delay arcs that each specify a propagation delay of a physical wire that connects an output of one of the physical elements to an input of another one of the physical elements;
for each connection in the logic design from an output of a first one of the logic components to an input of a second one of the logic components, determining a logic wire delay arc from the physical wire delay arcs of the physical elements that include the physical components to which the first and second logic components are mapped, each logic wire delay arc specifying a propagation delay from an output of the first logic component to an input of the second logic component.

3. The processor-implemented method of claim 1, wherein the propagation delays specified by the logic delay arcs include propagation delays from an input to an output of the physical elements that include the physical components to which the logic components are mapped.

4. The processor-implemented method of claim 1, wherein the mapping includes mapping at least two of the logic components of the logic design to physical components of one of the physical elements of the integrated circuit.

5. The processor-implemented method of claim 4, wherein the determining of the logic delay arcs of the at least two logic components includes solving a system of equations using the physical delay arcs of the physical element to which the at least two logic components are mapped.

6. The processor-implemented method of claim 1, wherein the outputting of the description includes creating a data structure in a memory of a computing system for storing data that specifies the propagation delays of the logic delay arcs.

7. The processor-implemented method of claim 1, wherein the integrated circuit includes programmable logic circuitry, and the physical elements include a plurality of programmable logic resources and a plurality of programmable interconnect resources.

8. The processor-implemented method of claim 1, wherein the static timing analysis identifies critical timing paths of the logic design.

9. The processor-implemented method of claim 1, wherein:
a data file specifies the physical components of the physical elements to which each of the logic components of the logic design can be mapped; and
the respectively mapping of the logic components to the physical components includes, for each of the logic components, selecting one the physical components and mapping the logic component to the one of the physical components.

10. The processor-implemented method of claim 9, wherein:
the data file further specifies each one of a plurality of physical pins of the physical components to which each one of a plurality of logic pins of the logic components can be mapped; and
the respectively mapping of the logic components to the physical components further includes, for each of the logic pins for each of the logic components, selecting one of the physical pins of the one of the physical components to which the logic component is mapped, and mapping the logic pin of the logic component to the one of the pins of the one of the physical components.

11. The processor-implemented method of claim 10, wherein the respectively mapping of the logic components to the physical components further includes, for the logic pins connected by each of a plurality of logic nets in the logic design, mapping the logic net to each physical pin to which the logic pins are mapped, and verifying, for each of a plurality of physical nets of the integrated circuit, that at most one of the logic nets is mapped to the physical pins connected by the physical net.

12. A processor-implemented method of static timing analysis of a logic design, comprising:
on at least one processor, executing instructions that cause the processor to perform operations including:
mapping a plurality of logic components of the logic design to a plurality of physical elements of an integrated circuit, wherein at least two of the logic components are mapped to one of the physical elements;
inputting physical element delay arcs of the physical elements of the integrated circuit;
determining logic delay arcs of the logic components from the physical element delay arcs of the physical elements, including determining the logic delay arcs of the at least two of the logic components from the physical element delay arcs of the one of the physical elements;
performing a static timing analysis of the logic components of the logic design using the logic delay arcs; and
outputting a description of the static timing analysis of the logic components of the logic design.

13. The processor-implemented method of claim 12, wherein the determining of the logic delay arcs of the at least two logic components includes solving a system of equations using the physical element delay arcs of the physical element to which the at least two logic components are mapped.

14. The processor-implemented method of claim 13, wherein:
the solving of the system of equations includes determining physical component delay arcs of a plurality of physical components in the physical element;
the physical component delay arcs are determined to reduce a sum of respective errors for the physical element delay arcs of the physical elements; and
the respective error for each physical element delay arc from an input to an output of the physical element is a magnitude of a difference between a value of the physical element delay arc and a sum, the sum being a sum of a value of the physical component delay arc of each physical component along a path from the input to the output of the physical element, the path having a greater value of the sum among a respective sum for each path from the input to the output of the physical element, the respective sum for each path being a sum of a value of the physical component delay arc of each physical component along the path.

15. The processor-implemented method of claim 14, wherein:
the mapping of the logic components of the logic design to the physical elements includes mapping the at least two logic components to physical components of the physical element; and
the logic delay arc of each logical component is mapped to one of the physical components in the physical element corresponding to the physical component delay arc of the physical component to which the logical component is mapped.

16. The processor-implemented method of claim 12, wherein each of the logic delay arcs specifies a propagation delay from an input to an output of one of the logic components.

17. The processor-implemented method of claim 12, wherein the static timing analysis identifies critical timing paths of the logic design.

18. A program storage medium, comprising:
a non-transitory processor-readable storage device configured with instructions for determining timing characteristics of a logic design, wherein execution of the instructions by one or more processors causes the one or more processors to perform operations including:
inputting physical delay arcs of a plurality of physical elements of an integrated circuit, each physical element including one or more physical components and each physical delay arc of the physical element specifying a propagation delay from an input of the physical element to an output of the physical element;
respectively mapping a plurality of logic components of the logic design to selected ones of the physical components of the physical elements;
for each of the logic components, determining logic delay arcs from the physical delay arcs of the physical element that includes the physical component to which the logic component is mapped, wherein each logic delay arc for each logic component specifies a propagation delay from an input of the logic component to an output of the logic component;
performing a static timing analysis of the logic components of the logic design using the logic delay arcs; and
outputting a description of the static timing analysis of the logic components of the logic design.

19. The program storage medium of claim 18, wherein the mapping includes mapping at least two of the logic components of the logic design to physical components of one of the physical elements of the integrated circuit.

20. The program storage medium of claim 19, wherein the determining of the logic delay arcs of the at least two logic components includes solving a system of equations using the physical delay arcs of the physical element to which the at least two logic components are mapped.

* * * * *